(12) United States Patent
Walker et al.

(10) Patent No.: US 9,020,431 B2
(45) Date of Patent: Apr. 28, 2015

(54) METHODS AND APPARATUS TO OBTAIN TRANSACTION INFORMATION

(75) Inventors: David Ryan Walker, Waterloo (CA); Steven Henry Fyke, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 320 days.

(21) Appl. No.: 13/050,306

(22) Filed: Mar. 17, 2011

(65) Prior Publication Data

US 2012/0238209 A1     Sep. 20, 2012

(51) Int. Cl.
| | |
|---|---|
| *H04B 7/00* | (2006.01) |
| *H04L 29/08* | (2006.01) |
| *H04L 29/06* | (2006.01) |
| *H04W 4/00* | (2009.01) |
| *G06Q 30/06* | (2012.01) |
| *H04W 4/02* | (2009.01) |

(52) U.S. Cl.
CPC .............. *H04L 67/16* (2013.01); *H04L 63/18* (2013.01); *H04W 4/008* (2013.01); *G06Q 30/06* (2013.01); *H04W 4/02* (2013.01); *Y10S 902/22* (2013.01)

(58) Field of Classification Search
CPC . G06Q 20/382; G06Q 20/3674; G06Q 30/06; G06Q 40/08; G06Q 50/22; G06Q 40/00
USPC .............. 455/41.1, 41.2, 550.1, 556.1, 556.2, 455/558; 705/64; 902/22
See application file for complete search history.

(56) References Cited

U.S. PATENT DOCUMENTS

| | | | | |
|---|---|---|---|---|
| 8,321,345 | B2 * | 11/2012 | Makhotin et al. | 705/41 |
| 2007/0198432 | A1 * | 8/2007 | Pitroda et al. | 705/64 |
| 2009/0098825 | A1 * | 4/2009 | Huomo et al. | 455/41.1 |
| 2009/0281947 | A1 * | 11/2009 | Erel | 705/44 |
| 2009/0300074 | A1 * | 12/2009 | Little | 707/202 |
| 2010/0051689 | A1 * | 3/2010 | Diamond | 235/380 |
| 2010/0332393 | A1 * | 12/2010 | Weller et al. | 705/44 |
| 2011/0078081 | A1 * | 3/2011 | Pirzadeh et al. | 705/44 |
| 2012/0215650 | A1 * | 8/2012 | Oba et al. | 705/26.1 |

OTHER PUBLICATIONS

European Patent Office, European Search Report issued in 11158745.7, dated Aug. 1, 2011, 9 pages.
European Patent Office, XP007905525, Official Journal of the European Patent Office, vol. 30, No. 11, Nov. 1, 2007, pp. 592-593.
Canadian Intellectual Property Office, "Office Action", issued in connection with corresponding Canadian Patent Application No. 2,771,674 on Jan. 30, 2014 (3 pages).
Canadian Intellectual Property Office, "Office Action," issued in connection with Application No. 2,771,674, Dec. 16, 2014, 4 pages.

\* cited by examiner

*Primary Examiner* — Edward Urban
*Assistant Examiner* — Ralph H Justus
(74) *Attorney, Agent, or Firm* — Fish & Richardson P.C.

(57) ABSTRACT

Methods and apparatus to obtain transaction information are described. One example method includes conducting a transaction using a proximity-based communication link, storing information related to the transaction in a database of a mobile device, identifying a service based on the information, querying the service from the mobile device, wherein the query is based on the information, and obtaining detail of the transaction from the service based on the information. Other implementations are possible.

22 Claims, 6 Drawing Sheets

METHODS AND APPARATUS TO OBTAIN TRANSACTION INFORMATION

FIELD OF THE DISCLOSURE

This disclosure relates generally to wireless transactions and, more particularly, to methods and apparatus to obtain transaction information.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

As described below, close-proximity or proximity-based communication systems, such as radio frequency identification (RFID), near-field communications (NFC), and the like, can be used by a mobile device, such as a smartphone, to interoperate with a retail point of sale terminal or device to facilitate a transaction between a consumer (or purchaser) and a retailer. That is, upon indicating to the retailer the goods the consumer desires to purchase, the retailer will inform the consumer of the total price of such goods. The consumer may then use his or her mobile device to transfer payment information to the retailer via the point of sale terminal or device using close-proximity communications by moving the mobile device within range of the point of sale. The retailer may subsequently verify the validity of the payment information and, if the payment information is valid, consider the goods paid in full. The mobile device may then, either automatically or through user intervention, access one or more registered services to obtain detail related to the transaction.

As described herein, a method includes conducting a transaction using a proximity-based communication link, storing information related to the transaction in a database of a mobile device, identifying a service based on the information, querying the service from the mobile device, wherein the query is based on the information, and obtaining detail of the transaction from the service based on the information. Identifying the service may include determining the most probable service used to conduct the transaction. The information related to the transaction need not include an identification of the service used to conduct the transaction. Identifying the service may include selecting a first service from a plurality of services and querying the first service and selecting a second service from the plurality of services when the query of the first service does not yield a match. The query may be based on timestamp information related to the transaction. The identification of the service may be based on a first portion of the information, which may be location-based information or information related to network connections of the mobile device. The query may be based on a second portion of the information different from the first portion of information. An apparatus for performing such a method is also described.

Figure 1:
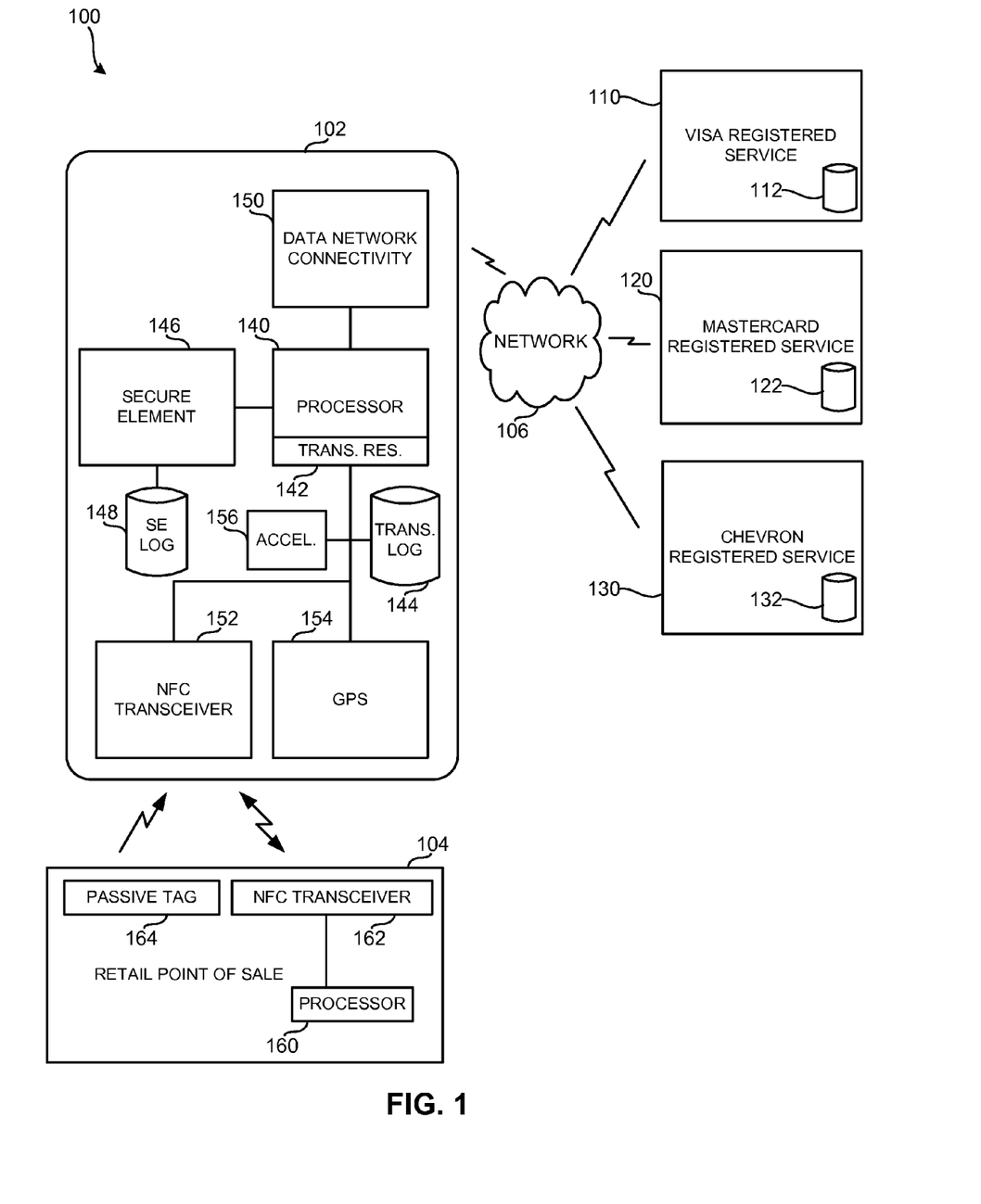
FIG. 1 is a block diagram of an example interaction between a mobile device and a retailer point of sale and an example interaction between a mobile device and one or more registered service.

Turning to FIG. 1, a system 100 is shown in which a mobile device 102 conducts a transaction with a point of sale terminal 104 via a proximity-based form of communication by sending payment information to the point of sale terminal 104. The mobile device 102 stores information related to the transaction in a mobile device transaction log. As shown in FIG. 1, the exchange of payment information and receipt information between the mobile device 102 and the point of sale terminal 104 may be carried out using NFC, in one example. However, any suitable close-proximity or proximity-based communication technology such as RFID or the like may be used.

Subsequently, to resolve additional transaction detail, such as, for example, transaction value or price, the mobile device 102 accesses via a network 106 one or more registered services having corresponding registered service transaction logs. In the example of FIG. 1, a Visa registered service 110 includes a Visa registered service transaction log 112, a MasterCard registered service 120 include a MasterCard registered service transaction log 122, and a Chevron registered service 130 includes a Chevron registered service transaction log 132. As explained below, the mobile device 102 may use information from the mobile device transaction log to obtain transaction detail (e.g., price or transaction value, credit or debit information, outstanding balance, etc.) from one or more of the registered service databases 112, 122, 132.

Figure 5:
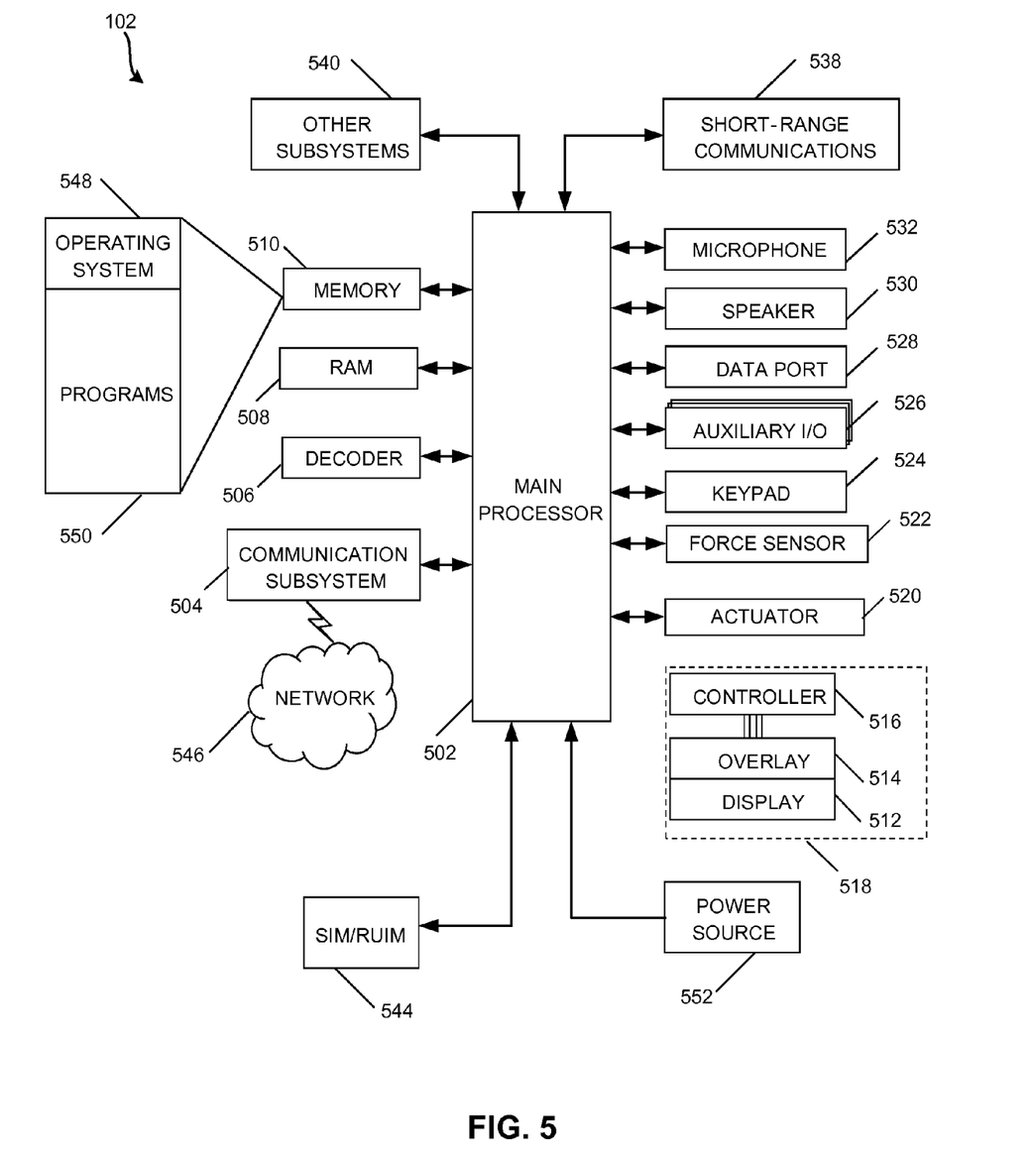
FIG. 5 is a diagram showing example hardware and software that may be used to implement the mobile device of FIG. 1.

The mobile device 102 may comprise a smartphone, a cellular telephone, a tablet computer, a portable computer, a touch pad-based device, or any other suitable device. A relevant portion of the mobile device 102 is shown in FIG. 1, but the mobile device 102 may include other devices or functionality not shown in FIG. 1. For example, the mobile device 102 may be implemented as shown in the example of FIG. 5.

In an example, the mobile device 102 includes a processor or controller 140 including instructions stored thereon in a memory. For example, as shown in FIG. 1, the instructions stored in memory may be such that when the instructions are executed, the processor 140 operates as a transaction resolver 142. The processor 140 may be implemented using any suitable microcontroller or microprocessor capable of executing instructions. Additionally, the processor 140 may include hardware implementations, such as application-specific integrated circuits (ASIC), programmable logic devices (PLDs), or any other suitable logic device or devices. While shown as part of the processor 140 in FIG. 1, the memory may be separate from the processor 140 and may be coupled to the processor 140 via one or more conductive lines. In the example of FIG. 1, the processor 140 is coupled to a mobile device transaction log 144, a secure element 146 having a secure element log 148, data network connectivity module 150, a NFC transceiver 152 (e.g., a close-proximity communication device), a global positioning system device (GPS) 154, and an accelerometer 156. Other examples are possible.

The transaction resolver 142 may be implemented by the processor 140 carrying out instructions that causes the processor 140 to obtain information from the mobile device transaction log 144 and use such information to obtain transaction detail from the registered services 110, 120, 130. In an alternate example, the transaction resolver 142 may be implemented separate from the processor 140 as a separate processor or controller. Alternatively, the transaction resolver 142 may be implemented using hardware, such as ASICs, other forms of logic, etc.

The transaction log 144 may be controlled by the processor 140 to maintain a listing of transactions that are carried out by the mobile device 102. For example, when the processor 140 controls the NFC transceiver 152 to conduct a payment, such as a payment to the retailer point of sale 104, the transaction log 144 may store information related to that transaction, such as a transaction identification, a transaction time and date, preselection information related to the transaction (e.g., the designation of a particular payment method to be used for one or more transactions or at one or more point of sale terminals), the transaction context, etc. However, the transaction log 144 may not store certain types of information and such information may not be available to the processor 140.

For example, with regard to transactions, certain information such as credit card information, debit card information, loyalty card information, transaction value, etc. is processed by the secure element 146 and stored in the secure element log 148. The secure element 146 and the secure log 148 may be implemented as a smart card chip. The secure element 146 and the secure log 148 facilitate provisioning of debit cards, credit cards, gift cards, loyalty cards, or any other forms of payment so that the mobile device 102 may be used to conduct secure transactions. The provisioned cards may correspond to the registered services. For example, the secure element may store credit card information corresponding to the Visa registered service 110, the MasterCard registered service 120, and/or the Chevron registered service 130. As transactions using the registered services are conducted, the secure element 146 logs those transactions in the secure element log 148. For security purposes, not all of the information in the secure element log 148 may be available to the processor 140 and, therefore, may not be recorded in the transaction log 144.

The data network connectivity module 150 may be implemented using any wireless communication technique. For example, the data network connectivity module 150 may comprise hardware or software, or both, that facilitate connection to the network 106, which may comprise a digital cellular network. Additionally or alternatively, the network 106 may comprise a local area network (LAN), a wide area network (WAN), and/or a wireless network of the 802.xx type or any other type of wireless network. Accordingly, the data network connectivity module 150 may facilitate communication with 802.xx type networks or any other networks. Thus, the data network connectivity module 150 may provide the cellular and wired fidelity (WIFI) data connectivity that is typically found in smartphones.

The NFC transceiver 152 may comprise a close-proximity communication device that may have multiple modes and that is controllable by the processor 140. In one example, the NFC transceiver 152 may emulate a NFC tag containing specified information. The NFC transceiver 152 may also operate in an information receiving mode or may operate in a NFC reader/writer mode in which the NFC transceiver 152 may be configured to interrogate, send commands and information to, and receive information from NFC tags. The NFC transceiver 152 may be implemented in accordance with the International Standards Organization standard ISO 14443. However, other types of close-proximity communication devices may be utilized instead of, or in addition to, the NFC transceiver 152. Additionally, the NFC transceiver 152 need not be used in favor of utilizing different, independent NFC devices. For example, the NFC transceiver 152 may be replaced by one or more active or passive NFC tags and a NFC reader/writer, any or all of which may be coupled to the processor 140.

The GPS 154 may comprise any device, such as a GPS module or assisted GPS (AGPS) module, that is useful in determining a physical or geographical location of the mobile device 102. For example, the GPS 154 may provide to the processor 140 an indication of the latitude and longitude at which the mobile device 102 is located. Additionally or alternatively, other forms of location information may be provided to the processor 140. For example, information such as the cell tower with which the mobile device 102 is communicating, a Bluetooth device with which the mobile device 102 is paired, a WI-FI network to which the mobile devices 102 is coupled, and/or any other suitable location information may be provided to the processor 140. The GPS 154 and any other suitable location information source may be implemented distinct from the processor 140 or may be implemented as part of the processor 140.

The accelerometer 156 may be used to provide motion information to the processor 140. For example, the accelerometer 156 may provide information and/or data that the processor 140 may use to determine whether the mobile device 102 is moving, whether the user of the mobile device 102 is standing or sitting, etc.

As explained herein, transaction information, location information, motion information, etc. may be used by the processor 140 to determine which registered service 110, 120, 130 the mobile device 102 should query to obtain additional transaction information. Alternatively, such information may be used to determine a priority of registered services that should be queried. The query may be carried out using information stored in the mobile device transaction log 144. When a suitable record match is obtained by query, additional transaction information may be obtained and stored in the mobile device 102 and/or be presented to the user of the mobile device 102. For example, a query may be made to one or more registered services (e.g., the registered services 110, 120, 130) to determine a value of a transaction that has taken place. That value may be stored or presented to the user. Other information from the registered service may also be obtained.

The point of sale terminal 104 may include any number of components such as cash register, a display screen, etc. In the example of FIG. 1, the point of sale terminal 104 includes a processor 160 and a NFC transceiver 162. The point of sale terminal 104 may also include a passive tag 164 that may be used to identify the location and the type of the point of sale terminal 104.

The processor 160 may include stored instructions in memory within or separate from the processor 160. The processor 160 may be implemented using any suitable microcontroller or microprocessor capable of executing instructions. Additionally, the processor 160 may include hardware implementations, such as ASICs, PLDs, or any other suitable logic device or devices. The processor 160 may be a stand-alone device, or may be implemented as part of a larger device. For example, in the context of a computer-based cash register, the functionality of the processor 160 may be implemented as part of the processor performing the cash register functionality. In an example, a portion of the point of sale terminal 104 may be implemented using the hardware of FIG. 6.

The NFC transceiver 162, similar to the NFC transceiver 152 described above, may be implemented using a close-proximity communication device having different modes of operation, such as a tag emulation mode, a peer-to-peer mode, and a NFC reader/writer mode. Additionally, the NFC transceiver 162 may be replaced with one or more NFC tags (passive or active NFC tags), a NFC reader/writer, or any other suitable components.

The passive tag 164 may be a type of passive tag storing information that identifies the point of sale terminal 104. For example, the passive tag 164 may store information identifying an attribute of the point of sale terminal 104 (e.g., a gas station, an automated teller machine, a fast food chain). The information in the passive tag 164 may also identify the geographic location of the point of sale terminal 104 and/or the name of the point of sale terminal 104, or any other suitable information. Although shown in the example of FIG. 1, the passive tag 164 may be replaced with an active tag, a combination of passive tags, and/or a combination of passive and active tags.

Figure 6:
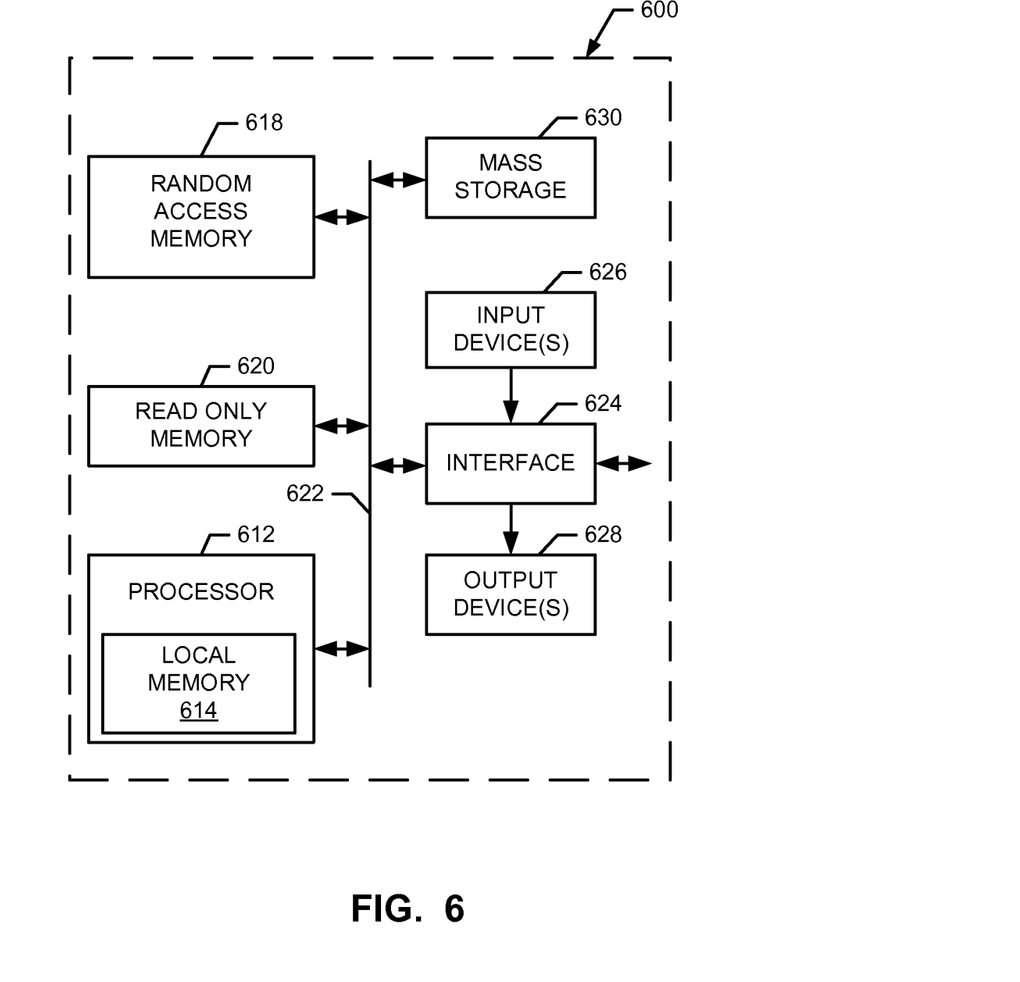
FIG. 6 is a block diagram of example hardware and software that may be used to implement the registered services of FIG. 1.

The registered services 110, 120, 130 and their associated transaction logs 112, 122, 132 may be implemented by computer hardware and software as shown in the example of FIG. 6. For example, the registered services 110, 120, 130 may be implemented as servers that log transactions for credit card companies, debit card companies, or any other suitable entity. That is, as a retailer makes sales and transacts business with customers, records of the transaction are uploaded to a registered service, which may check the credit of the purchaser, provide verification to the retailer of the credit or funding of the purchaser, and/or log completed transactions carried out by a purchaser. In an example, the registered services 110, 120, 130 track the records on a per-purchaser basis and make transaction detail available via an Internet-based interface (e.g., a website login), wherein card or account holders have been issued login credentials to allow access to their transaction detail.

In another example, the Visa registered service 110 may be operated by the Visa credit card company. In the example, Visa has an account for a purchaser and has issued a credit card to the purchaser, who is the user of the mobile device 102. Thus, the purchaser has registered his or her Visa card and/or Visa account with the mobile device 102 and, therefore, Visa is referred to as a registered service of the mobile device 102. Registering the Visa card and/or account with the mobile device 102 may include providing account number and password information, as well as login information to the mobile device 102, which stores such information in the secure element 146 and/or the transaction log 144, or in any other suitable location. As the purchaser uses the Visa registered service to purchase goods via his or her mobile device 102 at retail points of sale (e.g., the point of sale terminal 104), transaction detail is logged in the transaction log 112 of the Visa registered service 110. As described herein, the mobile device 102, which has one or more credentials to facilitate access to or a secure log into the Visa registered service 110, can use information in the transaction log 144 to obtain additional detail from the Visa registered service 110 via the network 106. Thus, information, such as transaction detail, that was previously unavailable to the mobile device 102 may be obtained from the Visa registered service 110.

Although the foregoing example used the Visa registered service as an example, any or all of the registered services 110, 120, 130 may provide secure login interfaces that enable the mobile device 102 to login and obtain transaction detail based on information stored, for example, in the transaction log 144 of the mobile device 102. Additionally, while the foregoing example describes the mobile device 102 accessing the Visa registered service 110 to obtain transaction detail, it may be the case that the mobile device 102 is unaware of the registered service used to conduct the transaction because such information is stored in the secure element 146 or the secure element log 148 and, thus, unavailable to the processor 140. Accordingly, the mobile device 102, when seeking to resolve transactions and obtain additional transaction detail, may access more than one registered service. For example, the mobile device 102 may use available information to make a priority of registered services to query in efforts to obtain additional transaction detail. Thus, the mobile device 102 may examine the transaction log 144 or any other available information and determine that the most likely registered service used to conduct a particular transaction is the MasterCard registered service 120 and the second most likely registered service used to conduct a particular transaction is the Visa registered service. Thus, the mobile device 102 may first query the MasterCard registered service 120 and, if the additional transaction detail is not found, the mobile device 102 may query the Visa registered service 110.

Figure 2:
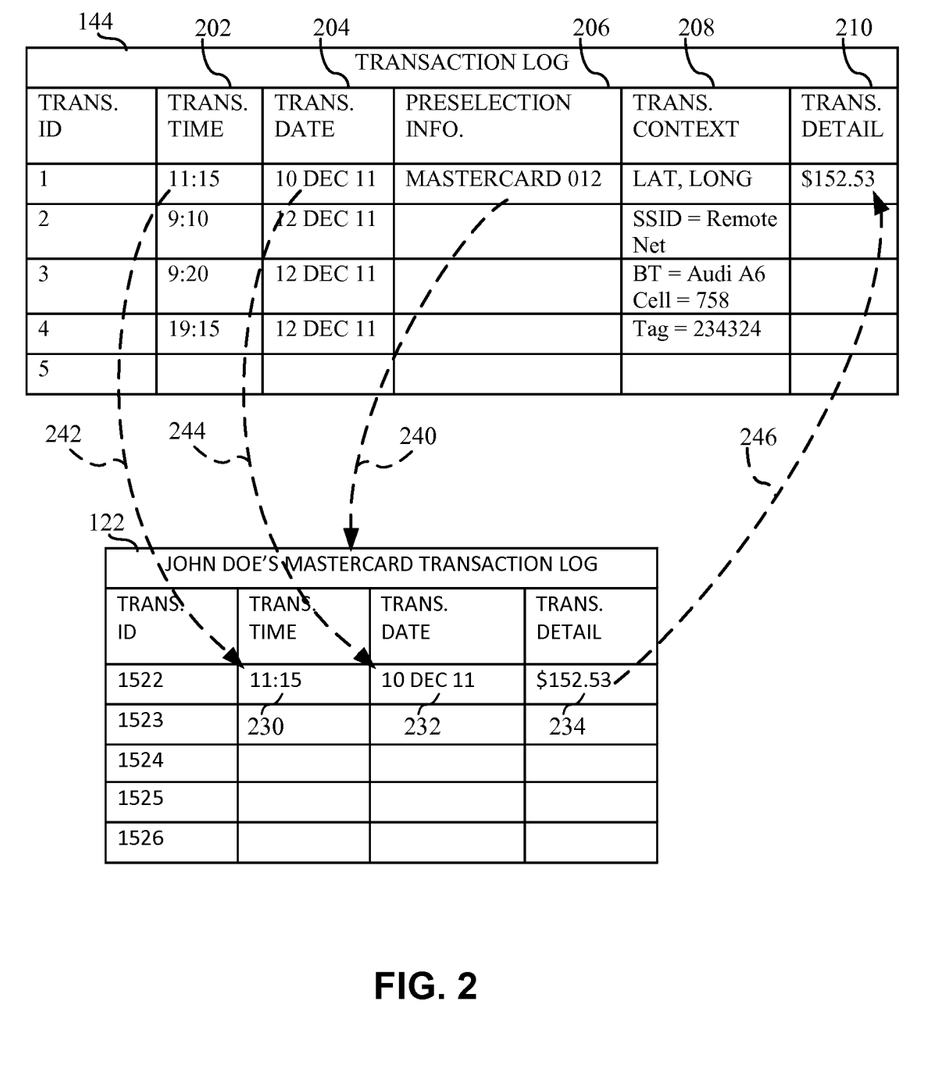
FIG. 2 is a diagram illustrating a mobile device transaction log being resolved with information from a registered service transaction log.

FIG. 2 shows an example of the information that may be stored in the mobile device transaction log 144, as well as, according to one example, the MasterCard transaction log 122, as well as dotted lines between the two logs showing how the transaction resolver 142 uses information in the mobile device transaction log 144 to obtain transaction detail from the MasterCard transaction log 122.

The mobile device transaction log 144 includes a number of records referred to by their transaction identifier. Each record includes a number of fields of information. In the example of FIG. 2, the mobile device transaction log 144 includes fields identifying transaction time 202, transaction date 204, preselection information 206, transaction context 208, and transaction detail 210.

The transaction time 202 and the transaction date 204 indicate the time and date at which a transaction took place. Preselection information 206 identifies any registered service that is preselected to be used for a particular transaction. For example, the preselection information 206 may be used to identify a default payment type or a selection of a payment type that was made prior to a transaction. The transaction context 208 may include any information related to the transaction. For example, the transaction context 208 may include location information related to where the transaction occurred, such as information from the GPS 154; a WI-FI identification, such as a service set identifier (SSID), of a network to which the mobile device 102 was connected during the transaction; an identity of a Bluetooth-paired device in use during the transaction; a cell or network tower to which the mobile device 102 was connected during the transaction; and/or information from a tag at the transaction site (e.g., information from the passive tag 164); etc.

As shown in FIG. 2, the first transaction identified (i.e., the transaction bearing transaction ID 1) in the mobile device transaction log 144 occurred at 11:15 on Dec. 10, 2011. A MasterCard ending in the numbers 012 was preselected to carry out the transaction, and the transaction occurred at a particular latitude and longitude, which is represented by the text LAT, LONG. Prior to the processor 140 resolving the transaction, the transaction detail, in this case the value of the transaction, are not present in the mobile device transaction log 144.

The second transaction (transaction ID 2) occurred at 9:10 on Dec. 12, 2011, when the mobile device 102 was connected to a WI-FI router having an SSID of "Remote Net." The third transaction (transaction ID 3) occurred at 9:20 on Dec. 12, 2011, when the mobile device 102 was paired with a Bluetooth device names "Audi A6," while the mobile device 102 was coupled to a cell tower identified by the number 758. The fourth transaction (transaction ID 4) occurred at 7:15 P.M. on Dec. 12, 2011, and the tag id 234324 was read during the transaction.

As described herein, information in the transaction log 144 may be used to determine a registered service that was most likely used for a particular transaction. After the most likely registered service or services have been identified, the mobile device 102 may query, such as through an Internet-based login, one or more registered service searching for transaction detail.

As shown in FIG. 2, the MasterCard registered service transaction log 122 for a particular user named John Doe, who, in this example, is the user of the mobile device 102, includes a transaction identification, a transaction time and date, and transaction detail. In an example, the MasterCard registered service transaction log 122 includes transaction number 1522, which has a transaction time and date (reference numerals 230, 232) of 11:15 on Dec. 10, 2011, and has transaction detail (reference numeral 234) indicating that the value of the transaction was $152.53.

As shown at the dotted line 240, the transaction resolver 142, when resolving the first transaction in the mobile device transaction log 144 uses the preselection information identifying the user of a MasterCard ending in 012 to determine that the transaction resolver 142 should access the MasterCard registered service transaction log 122 for John Doe. Once accessing the MasterCard registered service transaction log 122 for John Doe, as shown at dotted lines 242 and 244, the transaction resolver 142 uses the transaction time and date to identify that transaction 1522 in the MasterCard registered service transaction log 122 corresponds to transaction 1 in the mobile device transaction log 144. Accordingly, as shown at the dotted line 246, the transaction resolver 142 can obtain the transaction detail, which, in this case, are the value of the transaction, and write those detail into the mobile device transaction log 144. Thus, transaction detail that was not previously available to the mobile device 102 may be presented to the user and stored in the mobile device 102 is association with the corresponding transaction.

Flowcharts representative of example processes that may be executed to implement some or all of the elements and devices described herein are described below and shown in the drawings. In these examples, the process represented by each flowchart may be implemented by one or more programs comprising machine readable instructions for execution by a processor or controller or any suitable hardware, such as shown in one or all of FIG. 1, FIG. 5, and/or FIG. 6, or any other suitable device.

The one or more programs may be embodied in software or software instructions stored on a tangible medium such as, for example, a flash memory, a CD-ROM, a hard drive, a DVD, or a memory associated with a processor, but the entire program or programs and/or portions thereof could alternatively be executed by a device other than the microprocessor and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts may be implemented manually. As used herein, the term tangible computer readable medium is expressly defined to include any type of computer readable storage.

Additionally or alternatively, the example processes described herein may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium.

Figure 3:
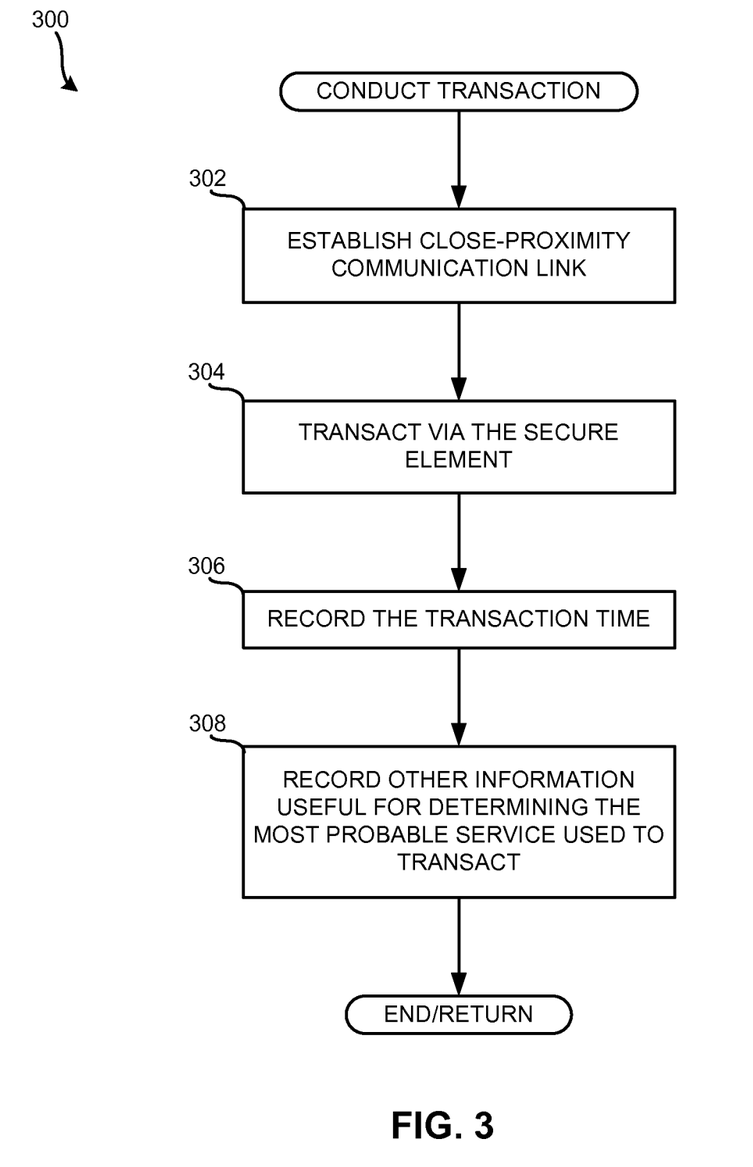
FIG. 3 is a flow diagram of an example process that may be carried out by the mobile device of FIG. 1 to conduct a transaction.

A process 300 to conduct a transaction, as shown in FIG. 3, may be carried out by a mobile device, such as the mobile device 102 of FIG. 1 and/or FIG. 5. To conduct a transaction, a purchaser has purchased goods at the point of sale terminal 104. When it is time to pay for the goods, the purchaser moves the mobile device 102 into proximity of the NFC transceiver 162 of the point of sale terminal 104. The mobile device 102 when brought near the NFC transceiver 162, establishes a close-proximity communication link with the NFC transceiver 162 (block 302).

Establishment of the communication link (block 302) facilitates the transaction between the secure element 146 of the mobile device 102 and the point of sale terminal 104 via the NFC transceiver 152 and the NFC transceiver 162 (block 304). The transaction may include transferring secure information indicative of a registered service to be used as payment from the mobile device 102 to the point of sale terminal 104.

During or after the transaction, the mobile device 102 records the transaction time (block 306). In an example, the transaction time, which may also include the transaction date, may be recorded in the mobile device transaction log 144. Additionally, the mobile device 102 records other information useful for determining the most probable service used to transact (block 308). This information may include preselection information, transaction context (e.g., geographic location, network information, Bluetooth connection information, NFC tag information, movement or motion information, etc.), and any other information. This information may be recorded in the transaction log 144, as described in conjunction with FIG. 2.

Figure 4:
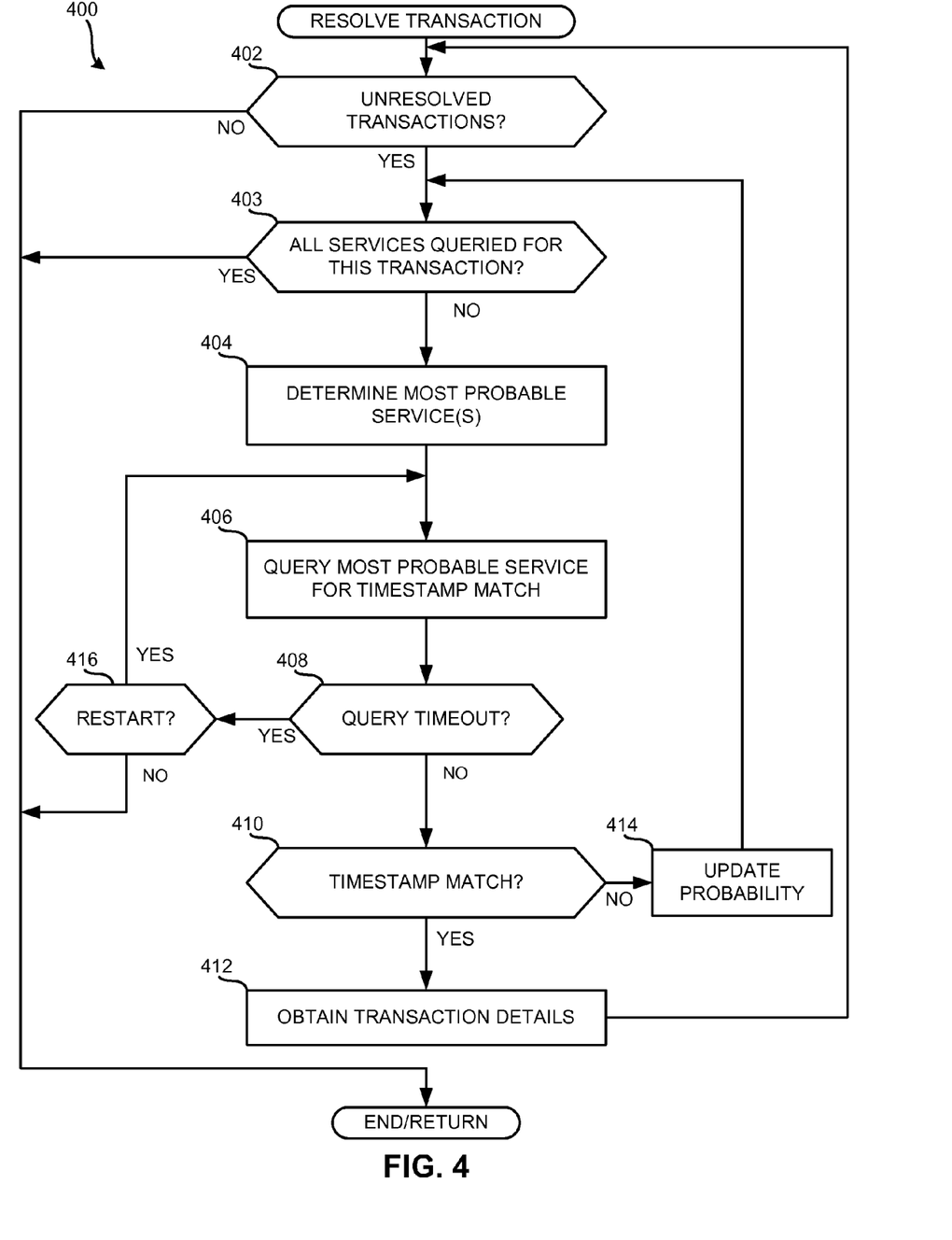
FIG. 4 is a flow diagram of an example process that may be carried out by the mobile device of FIG. 1 to resolve a transaction.

At some time, the mobile device 102 may utilize the transaction resolver 142 to resolve transactions and obtain additional detail regarding transactions. An example process that the transaction resolver 142 may follow is shown in FIG. 4 at reference numeral 400. The transaction resolver 142 determines whether there are unresolved transactions (block 402). For example, the transaction resolver 142 may examine the mobile device transaction log 144 to determine whether there are one or more records having blank transaction detail fields.

If there are no unresolved transactions, the process 400 ends. If, however, there are unresolved transactions (block 402), the transaction resolver 142 determines whether all registered services have been queried for the transaction to be resolved (block 403). If all registered services have not been queried for the transaction (block 403), the transaction resolver 142 determines the most probable registered service used to conduct the unresolved transaction (block 404). Alternatively, if all services have been queried for a particular transaction (block 403), the transaction cannot be resolved and the process 400 ends.

To determine the most probable registered service, the transaction resolver 142 may examine the mobile device transaction log 144. For example, the transaction resolver 142 may determine whether there is preselection information related to the transaction and may designate the preselected service as the most probable service. Alternatively, the transaction resolver 142 may use any information in the transaction context to make the determination of the most probable service. Many possible techniques may be used for determining the most probable service and different combinations of the above information can be used to predict future transactions at the same location utilizing user feedback (e.g., the user manually enters the transaction information).

In an example, location based information may be used by the transaction resolver 142 to determine the most probable registered service used in a transaction. For example, if location based information (e.g., GPS, network, cell tower, tag information, or the like) indicates that the mobile device 102 is at a retail point of sale that only accepts MasterCard and debit cards, the most probable registered services are the registered MasterCard and debit cards. As an additional example, if the accelerometer 156 indicates that the user of the mobile device 102 was driving just prior to the transaction and the driving again just after the transaction and the location based information indicates that the mobile device 102 was near a Chevron, then the Chevron is the most probable registered service. An additional indication or clue that may be utilized to determine the most probable service is the use of a loyalty card, which may also be logged in the mobile device transaction log 144. For example if the mobile device transaction log 144 indicates that at nearly the same time a payment was made a Chevron loyalty card was used, it is probable that the Chevron registered service was utilized.

Additionally, determination of the most probable service may be determined utilizing anonymous data from other users so that the system can become more accurate at prediction correlations between recorded device data and types of transactions. Accordingly, updated techniques for determining the most probable service may be periodically provided to the transaction resolver 142.

In another example, the most probable service may be designated by a user of the mobile device 102 at a time before the transaction. Alternatively, in a further example, a most probable service need not be determined. Rather, the transaction resolver 142 may query each of the registered services in series until a suitable match is found.

After the most probable service or services are identified (block 404), the transaction resolver 142 queries the most probable service to determine whether the registered service transaction log (e.g., the MasterCard transaction log 122) includes a transaction having a timestamp (e.g., time and/or date) (block 406). In an example, a timestamp is used because it is likely a unique identifier of a transaction for a particular account holder; however, other information may be used to identify whether a transaction is found in the registered service transaction log.

If the query to the registered service transaction log does not timeout (block 408), the transaction resolver 142 determines whether there is a timestamp match (block 410). If there is a timestamp match, the transaction resolver 142 obtains the transaction detail (block 412), which may include writing the transaction detail into the mobile device transaction log and/or displaying the transaction detail on the mobile device 102. If, however, there is not a timestamp match (block 410), the transaction resolver 142 updates the probability related to the registered service (block 414) to de-prioritize the registered service that was queried, but did not include a timestamp match. Thus, on the next operation of determining the most probable service (block 404), the previously-selected service will likely not be reselected as the most probable service. The process 400 may iteratively query the registered services looking for a match and attempting to resolve a particular transaction until all services have been queried, at which point the process 400 determines that the transaction cannot be resolved.

If the query to the most probable service times out (block 408), the user of the mobile device 102 may be prompted to restart the query process (block 416) or the process 400 may end. A query may timeout for a number of reasons including incorrect login credentials stored in the mobile device 102, lack of network connectivity, the registered service being off-line, etc.

A robust method of identifying corresponding transactions may comprise using the time and date the transaction occurred. However, this information can be augmented with additional data to help make the decision more accurate and predict correlations when no time stamp exists.

A block diagram of an example mobile device 102 is shown in FIG. 5. The mobile device 102 includes multiple components, such as a processor 502 that controls the overall operation of the mobile device 102. Communication functions, including data and voice communications, are performed through a communication subsystem 504. Data received by the mobile device 102 is decompressed and decrypted by a decoder 506. The communication subsystem 504 receives messages from and sends messages to a wireless network 546. The wireless network 546 may be any type of wireless network, including, but not limited to, data wireless networks, voice wireless networks, and networks that support both voice and data communications. A power source 552, such as one or more rechargeable batteries or a port to an external power supply, powers the mobile device 102.

The processor 502 interacts with other components, such as Random Access Memory (RAM) 508, memory 510, a display 512 with a touch-sensitive overlay 514 operably connected to an electronic controller 516 that together comprise a touch-sensitive display 518, one or more actuator apparatus 520, one or more force sensors 522, a keypad 524, an auxiliary input/output (I/O) subsystem 526, a data port 528, a speaker 530, a microphone 532, short-range communications 538, and other device subsystems 540. User-interaction with a graphical user interface is performed through the touch-sensitive display 518. The processor 502 interacts with the touch-sensitive overlay 514 via the electronic controller 516. Information, such as text, characters, symbols, images, icons, and other items that may be displayed or rendered on the mobile device 102, is displayed on the touch-sensitive display 518 via the processor 502. In some examples, the display 512 may include a primary display and a secondary display.

To identify a subscriber for network access, the mobile device 102 uses a Subscriber Identity Module or a Removable User Identity Module (SIM/RUIM) card 544 for communication with a network, such as the wireless network 546. Alternatively, user identification information may be programmed into memory 510.

The mobile device 102 includes an operating system 548 and software programs or components 550 that are executed by the processor 502 to implement various applications and instructions to carry out processes described herein and are typically stored in a persistent, updatable store such as the memory 510. Additional applications or programs may be loaded onto the portable electronic device 102 through the wireless network 546, the auxiliary I/O subsystem 526, the data port 528, the short-range communications subsystem 538, or any other suitable subsystem 540.

A received signal such as a text message, an e-mail message, or web page download is processed by the communication subsystem 504 and input to the processor 502. The processor 502 processes the received signal for output to the display 512 and/or to the auxiliary I/O subsystem 526. A subscriber may generate data items, for example e-mail messages, which may be transmitted over the wireless network 546 through the communication subsystem 504. For voice communications, the overall operation of the mobile device 102 is similar. The speaker 530 outputs audible information converted from electrical signals, and the microphone 532 converts audible information into electrical signals for processing.

The short-range communications 538 functionality may comprise NFC, RFID, or any other suitable short-range, close-proximity, or proximity-base communication technology. As described herein, the short-range communications 538 may be used to facilitate financial or retail transactions.

FIG. 6 is a block diagram of an example processing system 600 capable of implementing the apparatus and methods disclosed herein. The processing system 600 can correspond to, for example, a mobile device, an access control system, a security system, or any other type of computing device.

The system 600 of the instant example includes a processor 612 such as a general purpose programmable processor, an embedded processor, a microcontroller, etc. The processor 612 includes a local memory 614, and executes coded instructions 616 present in the local memory 614 and/or in another memory device. The processor 612 may execute, among other things, machine readable instructions to implement any, some or all of the processes shown in the drawings. The processor 612 may be any type of processing unit, such as one or more microprocessors, one or more microcontrollers, etc. Of course, other processors from other families are also appropriate.

The processor 612 is in communication with a main memory including a volatile memory 618 and a non-volatile memory 620 via a bus 622. The volatile memory 618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 620 may be implemented by flash memory and/or any other desired type of memory device. Access to the main memory 618, 620 is typically controlled by a memory controller (not shown).

The system 600 also includes an interface circuit 624. The interface circuit 624 may be implemented by any type of interface standard, such as an Ethernet interface, a universal serial bus (USB), and/or a third generation input/output (3GIO) interface.

One or more input devices 626 are connected to the interface circuit 624. The input device(s) 626 permit a user to enter data and commands into the processor 612. The input device(s) can be implemented by, for example, a keyboard, a mouse, a touchscreen, a track-pad, a trackball, an isopoint and/or a voice recognition system.

One or more output devices 628 are also connected to the interface circuit 624. The output devices 628 can be implemented, for example, by display devices (e.g., a liquid crystal display, a cathode ray tube display (CRT)), by a printer and/or by speakers. The interface circuit 624, thus, typically includes a graphics driver card.

The interface circuit 624 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The system 600 also includes one or more mass storage devices 630 for storing software and data. Examples of such mass storage devices 630 include floppy disk drives, hard drive disks, compact disk drives and digital versatile disk (DVD) drives.

As an alternative to implementing the methods and/or apparatus described herein in a system such as shown in FIG. 6, the methods and or apparatus described herein may be embedded in a structure such as a processor and/or an ASIC (application specific integrated circuit).

Further, although the example processes are described with reference to flowcharts, many other techniques for implementing the example methods and apparatus described herein may alternatively be used. For example, with reference to the flowcharts, the order of execution of the blocks may be changed, and/or some of the blocks described may be changed, eliminated, combined, and/or subdivided into multiple blocks. Any of the described blocks may be as implemented as part of an existing system. While the example block diagrams are described as implementing the processes of the flowcharts, the apparatus of the block diagrams may implement any process and, likewise, the processes of the flowcharts may be implemented by any apparatus, device, system, software, or combination thereof.

Finally, although certain example methods, apparatus and articles of manufacture have been described herein, the scope of coverage of this disclosure is not limited thereto. On the contrary, this disclosure covers all methods, apparatus and articles of manufacture and equivalents described and claimed herein.

What is claimed is:

1. A method comprising:
  completing a payment transaction using a proximity-based communication link;
  storing information related to the completed transaction in a database of a mobile device, the information comprising a timestamp of the transaction and at least one of preselection information, a transaction context, or a value of the transaction;
  after completion of the transaction, identifying a first service of multiple possible services as a most probable service to have been used to conduct the completed transaction based on the information, the identifying being performed by the mobile device;
  in response to identifying the first service, querying the identified first service from the mobile device, wherein the query is based on the information related to the completed transaction; and
  obtaining detail of the completed transaction from the identified first service in response to the query and based on the information related to the completed transaction.

2. The method of claim 1, wherein the information related to the completed transaction in the database of the mobile device does not include an identification of the first service used to conduct the completed transaction.

3. The method of claim 1, further comprising selecting a second service when the query of the first service does not yield a match between the information and transaction information stored by the first service.

4. The method of claim 1, further comprising iteratively querying a plurality of services including the first service until a match is found.

5. The method of claim 1, wherein the query is based on timestamp information related to the completed transaction.

6. The method of claim 1, wherein identifying the first service is based on second information related to a different completed transaction, the second information related to the different completed transaction being stored in the database of the mobile device.

7. The method of claim 1, wherein identifying the first service is based on a first portion of the information in the database of the mobile device.

8. The method of claim 7, wherein the first portion of the information in the database of the mobile device comprises location-based information.

9. The method of claim 7, wherein the first portion of the information in the database of the mobile device comprises information related to network connections of the mobile device.

10. The method of claim 7, wherein the first portion of the information in the database of the mobile device comprises information related to a tag detected at a location of the completed transaction.

11. The method of claim 7, wherein the first portion of the information in the database of the mobile device comprises information related to movement.

12. The method of claim 7, wherein the query is based on a second portion of the information different from the first portion of the information.

13. The method of claim 12, wherein the second portion of the information comprises a transaction time.

14. The method of claim 1, further comprising determining if detail of the completed transaction is missing.

15. The method of claim 1, wherein the information related to the completed transaction in the database of the mobile device does not include any information stored in a secure element of the mobile device.

16. The method of claim 1, wherein identifying the first service as the most probable service used to conduct the completed transaction comprises determining whether there is preselection information related to the completed transaction that designates the first service as a preselected service.

17. A mobile device comprising:
  a close-proximity communication device;
  a memory associated with the close-proximity communication device;
  a network connectivity module; and
  a processor coupled with the close-proximity communication device and the network connectivity module, wherein the processor is programmed to:
    complete a payment transaction using the close-proximity communication device;
    store information related to the transaction in the memory, the information comprising a timestamp of the payment transaction and at least one of preselection information, a transaction context, or a value of the payment transaction;
    after completion of the transaction, identify a first service of multiple possible services as a most probable service to have been used to conduct the completed transaction based on the information;
    in response to identifying the first service, query the identified first service based on the information related to the completed transaction; and
    obtain detail of the completed transaction from the identified first service in response to the query and based on the information related to the completed transaction using the network connectivity.

18. The mobile device of claim 17, wherein the processor selects the first service from a plurality of services.

19. The mobile device of claim 18, wherein the processor iteratively queries the plurality of services until a match between the information and transaction information stored by one of the plurality of services is found.

20. The mobile device of claim 17, wherein the processor identifies the first service based on one or more of location-based information, network connections of the mobile device, information related to a tag detected at a location of the completed transaction, and information related to movement.

21. The mobile device of claim 17, wherein the processor determines if detail of the completed transaction is missing.

22. A method to obtain detail for a completed transaction, the method comprising:
  conducting a payment transaction using a secure element of a mobile device via a proximity-based communication link of the mobile device;
  storing information related to the transaction in a transaction log of the mobile device, the information comprising a timestamp of the transaction and at least one of preselection information, a transaction context, or a value of the transaction, and the transaction log not including any information stored in the secure element of the mobile device;
  after completion of the transaction, identifying the transaction as being an unresolved transaction from the transaction log, the identifying being performed by the mobile device;
  in response to identifying the transaction as an unresolved transaction, identifying a first service of multiple possible services as a most probable service used to conduct the transaction based on the stored information related to the transaction;
  based on identifying the first service after the transaction, querying the identified first service from the mobile device, wherein the query is based on the information related to the transaction; and
  obtaining detail of the transaction from the identified first service at the mobile device in response to the query.

* * * * *